United States Patent
Elias et al.

(10) Patent No.: US 9,630,515 B2
(45) Date of Patent: Apr. 25, 2017

(54) DEVICE FOR THE INDUCTIVE TRANSMISSION OF ELECTRIC ENERGY

(71) Applicant: AUDI AG, Ingolstadt (DE)

(72) Inventors: Bjoern Elias, Hepberg (DE); Reinhard Peer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 525 days.

(21) Appl. No.: 13/936,384

(22) Filed: Jul. 8, 2013

(65) Prior Publication Data

US 2014/0008973 A1     Jan. 9, 2014

(30) Foreign Application Priority Data

Jul. 6, 2012   (DE) ................ 10 2012 013 498

(51) Int. Cl.
| | |
|---|---|
| H02J 50/90 | (2016.01) |
| H02J 50/10 | (2016.01) |
| B60L 11/18 | (2006.01) |
| H01F 38/14 | (2006.01) |
| H02J 5/00 | (2016.01) |

(52) U.S. Cl.
CPC ......... *B60L 11/182* (2013.01); *B60L 11/1831* (2013.01); *H01F 38/14* (2013.01); *H02J 5/005* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC ....... B60L 11/182; Y02T 90/125; Y02T 90/12
USPC ........................................ 307/104
See application file for complete search history.

(56) References Cited

U.S. PATENT DOCUMENTS

| | | | |
|---|---|---|---|
| 5,821,728 A | 10/1998 | Schwind | |
| 2005/0017677 A1* | 1/2005 | Burton | H02J 7/025 320/108 |
| 2005/0068009 A1* | 3/2005 | Aoki | G05F 1/70 323/205 |
| 2009/0045773 A1 | 2/2009 | Pandya et al. | |
| 2010/0231163 A1* | 9/2010 | Mashinsky | B60L 11/182 320/108 |
| 2012/0119698 A1* | 5/2012 | Karalis | B60L 11/182 320/108 |
| 2012/0242164 A1* | 9/2012 | Teggatz | H01F 38/14 307/104 |

FOREIGN PATENT DOCUMENTS

| | | |
|---|---|---|
| DE | 102009033239 | 1/2011 |
| EP | 2113180 | 11/2009 |
| WO | 2011/046400 | 4/2011 |
| WO | 2011/114942 | 9/2011 |

OTHER PUBLICATIONS

Chinese Office Action for related Chinese Patent Application No. 201310276127.1, issued Apr. 1, 2015, 9 pages.

* cited by examiner

*Primary Examiner* — Rexford Barnie
*Assistant Examiner* — Thai Tran
(74) *Attorney, Agent, or Firm* — Staas & Halsey LLP

(57) ABSTRACT

An apparatus inductively transmits electrical energy from a primary coil, which is arranged in a stationary unit, to a secondary coil, which is arranged in a vehicle. The primary coil and/or the secondary coil have or has at least one switchable coil tap for adjusting a coil length which is active for the inductive energy transmission.

19 Claims, 2 Drawing Sheets

DEVICE FOR THE INDUCTIVE TRANSMISSION OF ELECTRIC ENERGY

CROSS REFERENCE TO RELATED APPLICATIONS

This application is based on and hereby claims priority to German Patent No. 10 2012 013 498 filed on Jul. 6, 2012, the contents of which are hereby incorporated by reference.

BACKGROUND

The invention relates to an apparatus for the inductive transmission of electrical energy from a primary coil, which is arranged in a stationary unit, to a secondary coil, which is arranged in a vehicle.

Electrically driven vehicles require a charging apparatus in order to recharge the electrical energy storage device at regular intervals. Charging devices in which the user initiates the charging process by establishing contact between a charging cable and a socket which is fitted in the vehicle are not favorable on account of the lack of user-friendliness. Instead, the trend in electric vehicles is toward charging apparatuses which are based on contactless energy transmission.

In general, the at least one primary coil generates a magnetic field which allows energy transmission to the secondary coil across an air gap. However, efficient and reliable energy transmission over the air gap requires good positioning of the primary coil and the secondary coil, and the optimum position is therefore when the vehicle is parked above the apparatus such that the secondary coil is located exactly above the primary coil. However, if the vehicle is parked offset from the optimum position, the losses increase and, at the same time, the charging time increases.

EP 2 113 180 A2 discloses an apparatus for the inductive transmission of electrical energy, which apparatus is in the form of a carpet and comprises current conductors which are woven in as threads. An electrical load which is placed on the apparatus can be supplied with energy independently of the position of the load.

DE 10 2009 033 239 A1 proposes an apparatus for the inductive transmission of electrical energy in which a large number of identical primary coils which are arranged in the manner of a matrix is provided. In order to compensate for any offset which may occur between the stationary primary coil and the secondary coils which are arranged in the vehicle, provision is made to supply power in each case to those primary coils which are in line with corresponding secondary coils of a vehicle which is parked above the apparatus. However, the structural outlay for the large number of separate primary coils and secondary coils is high.

SUMMARY

One possible object is therefore specifying an apparatus for the inductive transmission of electrical energy, in which apparatus the vehicle can be positioned in relation to the apparatus with a greater level of tolerance.

The inventors propose an apparatus for the inductive transmission of electrical energy from a primary coil, which is arranged in a stationary unit, to a secondary coil, which is arranged in a vehicle. The inventors propose for the primary coil and/or the secondary coil to have at least one switchable coil tap for adjusting a coil length which is effective for the inductive energy transmission.

The proposals are based on the knowledge that the desired compensation of positioning tolerances can be achieved by at least one of the two coils having a coil tap with which the effective coil length can be adapted. This means that only that portion of a coil which is in line with the respectively other coil can be activated. This prevents an electromagnetic field being generated by those coil portions which are not in line with the respectively other coil.

In the proposed apparatus, provision can be made for the apparatus to have a control device for switching the at least one coil tap. The coil tap in question can be switched by the control device, that is to say the control device can activate or deactivate a specific coil section. In this way, it is determined whether a specific portion of the primary coil generates the electromagnetic field and, analogously, a certain region of the secondary coil can be activated or deactivated.

A particularly high degree of efficiency can be achieved by the control device being designed to detect that coil tap which, when switched, orients the primary coil and the secondary coil in relation to one another in an optimum manner. To this end, the control device can have a corresponding measurement device which allows the optimum coil tap, at which the charging process takes place with a high degree of efficiency, to be determined.

A development can make provision for a first control device to be associated with the primary coil, and for a second control device, which communicates with the first control device, to be associated with the secondary coil. In this refinement, both the primary coil and the secondary coil can each have one or more switchable coil taps, so that it is possible to adapt to the actual position of the vehicle in relation to the stationary primary coil in a particularly flexible manner.

It is particularly preferred for the primary coil and/or the secondary coil to be substantially cylindrical and have at least one switchable coil tap at the two opposite end sections. The effective length of one of the coils or both of the coils, which length is active during the charging process, can be changed by the switchable coil tap or taps, as a result of which particularly good adaptation is possible. In this case, the primary coil and the secondary coil each have a coil core which is arranged in the interior of the respective coil.

A development makes provision for the primary coil to be arranged on or in a ground surface substantially transverse to the longitudinal axis of the vehicle. This provides the option of compensating for a transverse offset of the vehicle by corresponding switching of the coil tap. The tolerance of the parking position is increased by virtue of this measure, as a result of which a particularly high degree of user friendliness is produced in turn.

The proposals can also be used for the following further applications. Secondary coils of different width can be used, these being required by vehicles of different size or width. The secondary coils of different width can likewise be used in a contactless manner and with a high degree of efficiency for energy transmission by the primary coil or primary coils being adjusted to the corresponding, different total widths. This matching is performed by connecting or disconnecting the constituent parts of the coils by the coil taps.

Different distances, substantially vertical distances such as an air gap, between the primary coil and the secondary coil can likewise be compensated for by switching the coil taps. In the event of a change in the distance between the primary coil and secondary coil, the voltage level on the secondary side changes. In order to be able to return to the ideal voltage level, that is to say the setpoint voltage, the number of turns on the primary side can be changed by adjusting the effective coil length. Fewer turns generate a lower voltage on the secondary side. This change in voltage on the secondary side can be carried out at any time, even during a charging process.

Furthermore, the power transmitted in total can be increased by parallel connection on the primary side by simultaneous operation of a plurality of or all of the sections of the primary coil and corresponding parallel activation of a plurality of or all of the sections of the secondary coil.

In addition, the inventors propose a motor vehicle. The motor vehicle according has a secondary coil of an apparatus for the inductive transmission of electrical energy of the described type.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
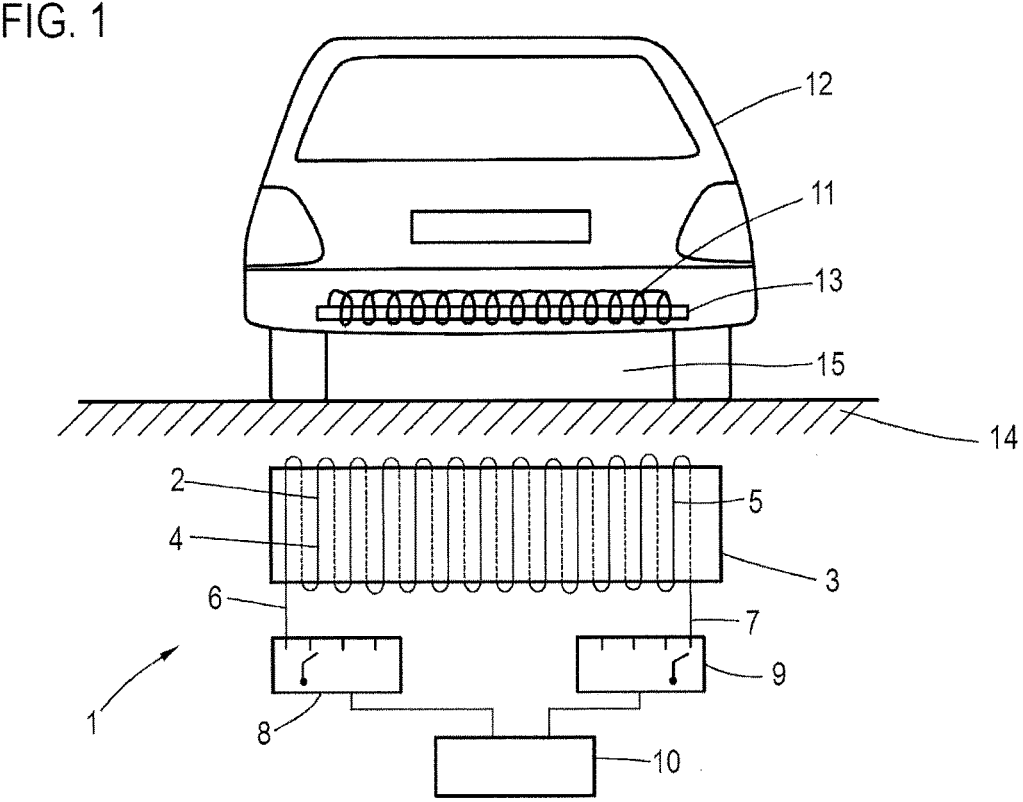
FIG. 1 shows a schematic illustration of a potential embodiment for the proposed apparatus.

Reference will now be made in detail to the preferred embodiments of the present invention, examples of which are illustrated in the accompanying drawings, wherein like reference numerals refer to like elements throughout.

The apparatus 1, shown in FIG. 1, for the inductive transmission of electrical energy comprises a primary coil 2 which is wound as a coil core about a ferrite body 3 which is arranged horizontally in the installed state. The primary coil 2 has opposite end sections 4, 5 and extends from one end section 4 to the opposite end section 5.

FIG. 1 shows that the primary coil 2 has a plurality of coil taps 6, 7, wherein the coil taps 6 are associated with the end section 4 which is on the left-hand side in FIG. 1, and the coil taps 7 are associated with the end section 5 which is shown on the right hand side in FIG. 1. The coil taps 6, 7 are each coupled to a multistage switch 8, 9; the two switches 8, 9 are connected to a control device 10. The control device 10 controls the two switches 8, 9, so that in each case a specific portion of the end sections 4, 5 of the primary coil 2 is connected or activated. FIG. 1 shows that a specific line path is in each case connected by the switch 8, 9 in each case, as a result of which the effective length of the primary coil 2 can be determined. In the illustrated exemplary embodiment, the switches 8, 9 have three different switching positions, but in other embodiments only two switching positions or more than three switching positions can also be provided. The control device 10 controls the flow of current through the primary coil 2, an electromagnetic field is generated by the current, and the electromagnetic field induces a voltage in a secondary coil 11 of a vehicle 12. In accordance with the primary coil 2, the secondary coil 11 has a ferrite body 13 and is connected to a rechargeable battery of the vehicle 12. Energy is transmitted across an air gap 15 or clearance beneath the vehicle 12.

The primary coil 2 is integrated in a ground surface 14, so that the electrical energy storage device of the vehicle 12 is charged when the vehicle 12 is parked on the ground surface 14.

Adaptation to the actual lateral parking position of the vehicle 12 can be performed by the plurality of coil taps 6, 7 in the region of the end sections 4, 5 of the primary coil 2. Efficient charging which exhibits low losses can take place only when the primary coil 2 and the secondary coil 11 are positioned virtually congruently.

Figure 2:
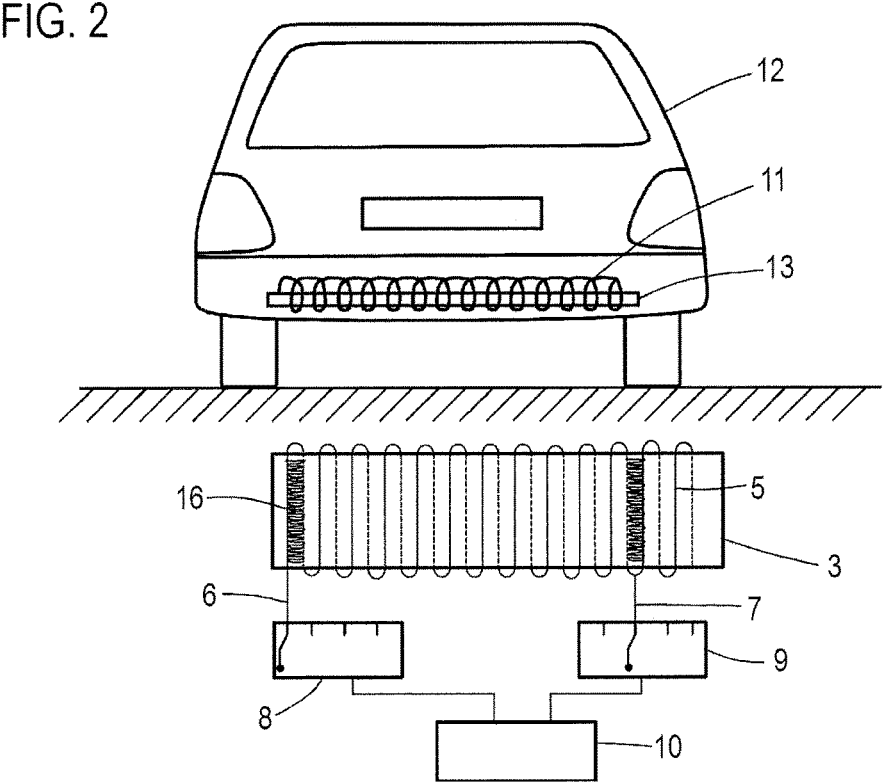
FIG. 2 shows the electric field during the operation of the apparatus.

FIG. 2 shows the operation of the apparatus 1 when the vehicle 12 is parked to the left of the optimum position. In this case, the switches 8, 9 are controlled by the control device 10 such that coil taps 6, 7 which are located approximately beneath the secondary coil 11 of the vehicle 12 are selected. The field concentration 16 produced as a result shows that the offset in positioning can be compensated for by the switches 8, 9, that is to say the actively used sections of the primary coil 2 are adapted and adjusted in accordance with the position of the parking vehicle 12.

Figure 3:
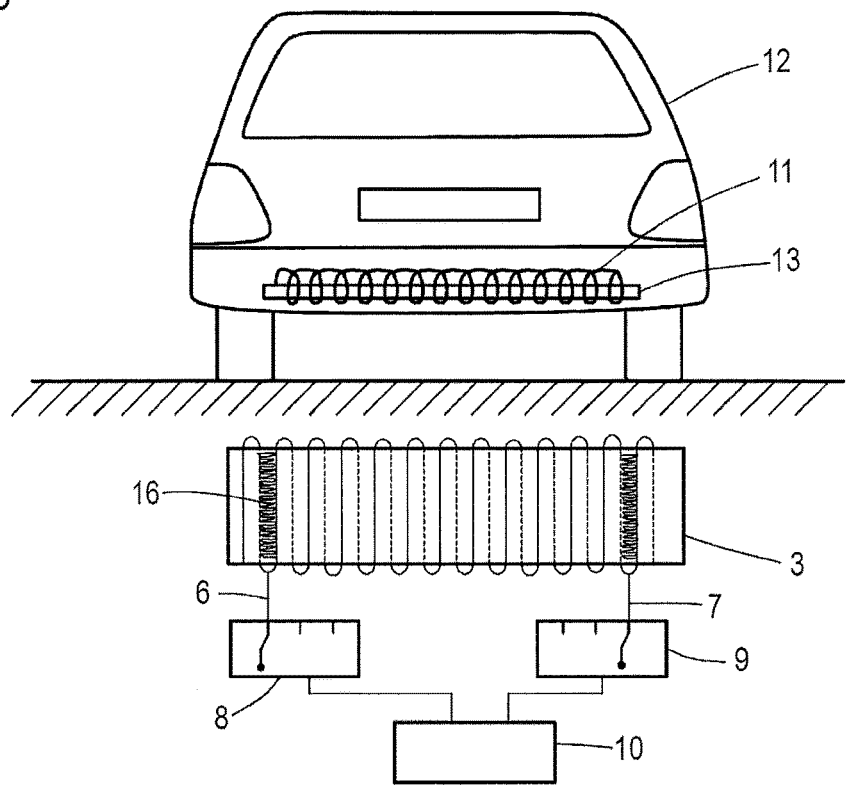
FIG. 3 shows a similar illustration to that in FIG. 2 with a vehicle parked in a different position.

FIG. 3 shows a similar illustration to that in FIG. 2, but the vehicle 12 is parked virtually centrally above the primary coil 2. Accordingly, coil taps 6, 7 which are selected by the control device 10 are again switched and the effective length of the secondary coil 11 is matched to the actual parking position of the vehicle 12. This results in a different field concentration 16 to that in the exemplary embodiment illustrated in FIG. 2.

Figure 4:
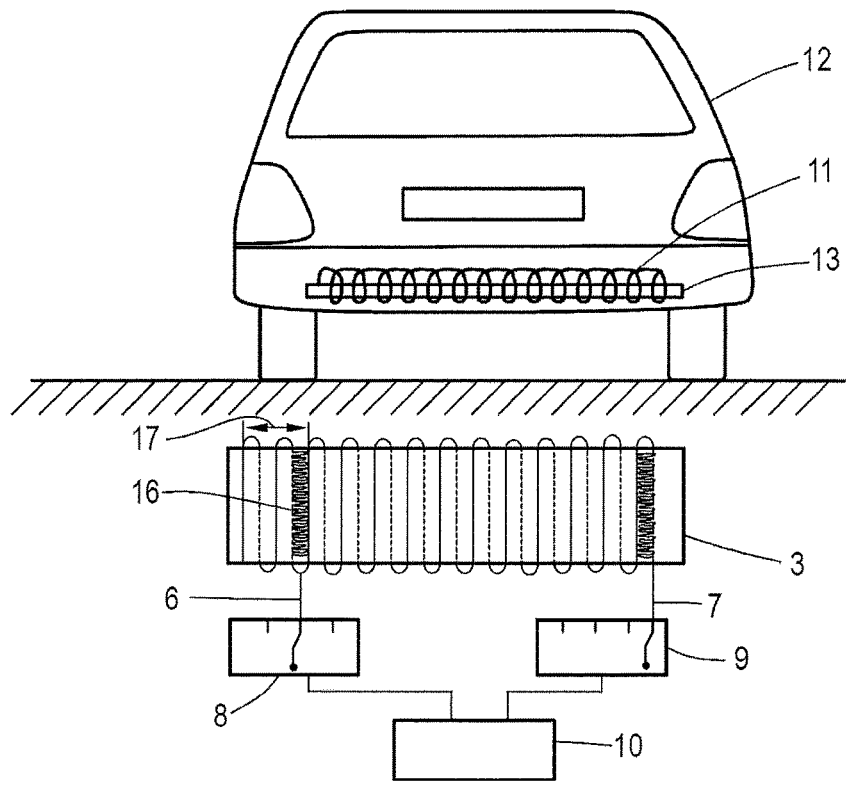
FIG. 4 shows a further operating state with a vehicle parked in a different position.

FIG. 4 finally shows a further operating state, in which the vehicle 12 is parked further to the right in relation to the primary coil 2. Accordingly, suitable coil taps 6, 7 are again selected by the control device 10 and switched by the switches 8, 9. The resulting field concentration 16 is optimum for the position of the vehicle 12.

In FIG. 4, a double-headed arrow 17 shows the operating region or the tolerance region in the transverse direction of the vehicle 12 which can be compensated for by the apparatus 1. The apparatus 1 permits particularly simple operator control since, in the case of a charging process, it is not subject to any exacting requirements in respect of exact positioning of the motor vehicle above the primary coil 2.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. An apparatus comprising:
   a primary coil supplied with electrical energy, the primary coil being arranged in a stationary unit; and
   a secondary coil to inductively receive electrical energy from the primary coil, the secondary coil being arranged in a motor vehicle,
   wherein
   at least one of the primary coil and the secondary coil includes first and second switchable coil taps to adjust a length of an active coil portion, the active coil portion being active for inductive energy transmission, the first and second switchable coil taps are provided respectively at first and second opposing end sections of the at least one of the primary coil and the secondary coil, a first multistage switch connects the first switchable coil tap to one of a first plurality of positions at the first end section to selectively activate a specific portion of the first end section, and a second multistage switch connects the second switchable coil tap to one of a second plurality of positions at the second end section to selectively activate a specific portion of the second end section, wherein none of the first plurality of positions at the first end section overlap with any of the second plurality of positions at the second end section.

2. The apparatus according to claim 1, wherein the first and second switchable coil taps are provided on the primary coil.

3. The apparatus according to claim 1, wherein the first and second switchable coil taps are provided on the secondary coil.

4. The apparatus according to claim 1, further comprising: a control device to control the first and second multistage switches.

5. The apparatus according to claim 4, wherein the control device detects an opposing coil, to control the first and second multistage switches to switch the first and second switchable coil taps such that, when switched, the primary coil and the secondary coil are oriented in relation to one another in an optimum manner.

6. The apparatus according to claim 4, wherein a first control device is associated with the primary coil, and a second control device, which communicates with the first control device, is associated with the secondary coil.

7. The apparatus according to claim 6, wherein first and second switchable coil taps are provided on the primary coil, and first and second switchable coil taps are provided on the secondary coil.

8. The apparatus according to claim 1, wherein the primary coil is substantially cylindrical and includes first and second opposing end sections, and first and second switchable coil taps are provided respectively at the first and second opposing end sections of the primary coil.

9. The apparatus according to claim 8, wherein the primary coil is arranged on or in a ground surface, and the primary coil extends substantially transverse to a longitudinal axis of the motor vehicle and parallel to an axle for rotating a wheel of the motor vehicle.

10. The apparatus according to claim 8, wherein the primary coil is arranged on or in a ground surface, and the primary coil extends substantially transverse to a longitudinal axis of the motor vehicle.

11. The apparatus according to claim 8, wherein the primary coil is arranged under a parking space, the primary coil is arranged substantially transverse to a longitudinal axis of the motor vehicle when the motor vehicle is parked in the parking space, the secondary coil is arranged in the motor vehicle, substantially transverse to the longitudinal axis of the motor vehicle, first and second switchable coil taps are provided on the primary coil to adjust a location of the active coil portion of the primary coil, and the first and second switchable coil taps laterally move the active coil portion of the primary coil to compensate for lateral position deviations of the motor vehicle in the parking space.

12. The apparatus according to claim 1, wherein the secondary coil is substantially cylindrical and includes first and second opposing end sections, and first and second switchable coil taps are provided respectively at the first and second opposing end sections of the secondary coil.

13. The apparatus according to claim 1, wherein first and second switchable coil taps are provided respectively at the first and second opposing end sections of the primary coil, and the primary coil is a substantially cylindrical single coil, arranged on or in a ground surface, includes first and second opposing end sections, and extends substantially transverse to a longitudinal axis of the motor vehicle, parallel to an axle for rotating a wheel of the motor vehicle, and perpendicular to a vertical direction of the vehicle.

14. A motor vehicle, comprising:
a secondary coil to inductively receive electrical energy from a primary coil arranged outside of the motor vehicle, wherein at least one of the primary coil and the secondary coil includes first and second switchable coil taps to adjust a length of an active coil portion, the active coil portion being active for inductive energy transmission, the first and second switchable coil taps are provided respectively at first and second opposing end sections of the at least one of the primary coil and the secondary coil, a first multistage switch connects the first switchable coil tap to one of a first plurality of positions at the first end section to selectively activate a specific portion of the first end section, and a second multistage switch connects the second switchable coil tap to one of a second plurality of positions at the second end section to selectively activate a specific portion of the second end section, wherein none of the first plurality of positions at the first end section overlap with any of the second plurality of positions at the second end section.

15. The motor vehicle according to claim 14, wherein the first and second switchable coil taps are provided on the secondary coil.

16. The motor vehicle according to claim 14, further comprising an energy storage device to receive electrical energy from the secondary coil.

17. An inductive transmission apparatus to inductively supply electric energy to a secondary coil mounted in a motor vehicle transversely with respect to a longitudinal axis of the motor vehicle, the apparatus comprising:

a primary coil mounted in a stationary unit at a parking space for the motor vehicle, the primary coil being supplied with electrical energy, the primary coil having first and second opposing end sections;

first and second switchable coil taps provided respectively at the first and second opposing end sections, to adjust a length of an active coil portion, the active coil portion being active for inductive energy transmission;

a first multistage switch which connects the first switchable coil tap to one of a first plurality of positions at the first end section to selectively activate a specific portion of the first end section, and a second multistage switch which connects the second switchable coil tap to one of a second plurality of positions at the second end section to selectively activate a specific portion of the second end section; and a control device to control the first and second multistage switches to switch the first and second switchable coil taps and match a location of the active coil portion with a location of the secondary coil, wherein none of the first plurality of positions at the first end section overlap with any of the second plurality of positions at the second end section.

18. The inductive transmission apparatus according to claim 17, wherein each of the first and second plurality of positions include at least three positions.

19. The inductive transmission apparatus according to claim 17, wherein if the motor vehicle is parked in the parking space such that the secondary coil mounted in the motor vehicle is offset in a transverse direction relative to the primary coil mounted in the stationary unit, the control device controls the first and second multistage switches to switch the first and second switchable coil taps so that only those portions of the first and second end sections which are aligned in the transverse direction with the secondary coil mounted in the motor vehicle are activated.

* * * * *